United States Patent
Barnett et al.

(10) Patent No.: US 11,720,377 B2
(45) Date of Patent: Aug. 8, 2023

(54) METHODS AND SYSTEMS FOR DYNAMICALLY GENERATING CONTEXTUAL USER INTERFACE ELEMENTS

(71) Applicant: Navan, Inc., Palo Alto, CA (US)

(72) Inventors: Connor Jennings Barnett, Atherton, CA (US); Ali Ozturk, Amsterdam (NL); Alexander Lechner, Amsterdam (NL); Carlo Melisi, Amsterdam (NL)

(73) Assignee: Navan, Inc., Palo Alto, CA (US)

( * ) Notice: Subject to any disclaimer, the term of this patent is extended or adjusted under 35 U.S.C. 154(b) by 0 days.

(21) Appl. No.: 17/369,407

(22) Filed: Jul. 7, 2021

(65) Prior Publication Data

US 2022/0012072 A1  Jan. 13, 2022

Related U.S. Application Data

(60) Provisional application No. 63/050,544, filed on Jul. 10, 2020.

(51) Int. Cl.
  *G06F 17/10* (2006.01)
  *G06F 9/451* (2018.01)
  (Continued)

(52) U.S. Cl.
  CPC .......... *G06F 9/451* (2018.02); *G06F 3/04842* (2013.01); *G06F 16/958* (2019.01);
  (Continued)

(58) Field of Classification Search
  CPC .... G06F 9/451; G06F 16/958; G06F 16/9566; G06F 16/9577; G06F 3/04842;
  (Continued)

(56) References Cited

U.S. PATENT DOCUMENTS 5,832,451 A * 11/1998 Flake ................... G06Q 10/025
                                                       705/5
5,940,496 A *  8/1999 Gisby ..................... H04M 3/58
                                                     379/230
(Continued)

FOREIGN PATENT DOCUMENTS

AU      2012378630 B2    5/2016
CN       111831882 A  * 10/2020
(Continued)

OTHER PUBLICATIONS

Notice of Allowance dated Nov. 9, 2020 for U.S. Appl. No. 16/113,472 of Iian Ezra Twig, filed Aug. 27, 2018, 13 pages.
(Continued)

*Primary Examiner* — Shahid K Khan
(74) *Attorney, Agent, or Firm* — Fenwick & West LLP

(57) ABSTRACT

A method for dynamically generating at least one contextual user interface element within a user interface and establishing a connection between a first computing device associated with a user of the user interface and a second computing device associated with a contact center agent includes analyzing, by a user interface display component executing on a first computing device, a uniform resource locator of a web page while a user views the web page on a second computing device. The user interface display component identifies a plurality of support topics, accesses profile data associated with the user, and determines whether the profile data identifies an existing travel reservation. The user interface display component generates a first subset of the plurality of support topics and modifies a user interface displayed by the web page to include a user interface element associated with a support topic in the first subset.

8 Claims, 12 Drawing Sheets

(51) Int. Cl.

| | | |
|---|---|---|
| *G06F 3/04842* | (2022.01) | |
| *H04L 67/141* | (2022.01) | |
| *H04L 67/02* | (2022.01) | |
| *G06F 16/957* | (2019.01) | |
| *G06F 16/955* | (2019.01) | |
| *G06Q 10/02* | (2012.01) | |
| *G06F 16/958* | (2019.01) | |
| *H04L 67/306* | (2022.01) | |

(52) U.S. Cl.
CPC ...... *G06F 16/9566* (2019.01); *G06F 16/9577* (2019.01); *G06Q 10/02* (2013.01); *H04L 67/02* (2013.01); *H04L 67/141* (2013.01); *H04L 67/306* (2013.01)

(58) Field of Classification Search
CPC ....... G06Q 10/02; H04L 67/02; H04L 67/141; H04L 67/306
See application file for complete search history.

(56) References Cited

U.S. PATENT DOCUMENTS

| | | | |
|---|---|---|---|
| 6,029,144 A | 2/2000 | Barrett | |
| 6,185,587 B1* | 2/2001 | Bernardo | G06F 40/166 707/E17.112 |
| 6,233,332 B1* | 5/2001 | Anderson | H04M 3/5233 379/265.09 |
| 6,311,194 B1 | 10/2001 | Sheth | |
| 6,442,526 B1 | 8/2002 | Vance | |
| 6,609,658 B1 | 8/2003 | Sehr | |
| 6,662,190 B2 | 12/2003 | Bax | |
| 6,910,628 B1 | 6/2005 | Sehr | |
| 7,023,979 B1* | 4/2006 | Wu | H04M 3/5233 379/265.11 |
| 7,039,176 B2* | 5/2006 | Borodow | H04L 65/1101 379/265.09 |
| 7,152,018 B2 | 12/2006 | Wicks | |
| 7,319,986 B2 | 1/2008 | Praisner | |
| 7,328,166 B1* | 2/2008 | Geoghegan | G06Q 10/02 705/5 |
| 7,392,160 B2 | 6/2008 | Wicks | |
| 7,506,257 B1* | 3/2009 | Chavez | G06F 11/1469 715/714 |
| 7,657,531 B2 | 2/2010 | Bisbee | |
| 7,660,743 B1* | 2/2010 | Messa | G06Q 10/02 705/26.25 |
| 7,689,902 B1* | 3/2010 | Olawsky | G06F 40/143 715/234 |
| 7,716,077 B1* | 5/2010 | Mikurak | G06Q 10/0631 705/7.12 |
| 7,720,702 B2 | 5/2010 | Fredericks | |
| 8,051,098 B2 | 11/2011 | Bisbee | |
| 8,238,541 B1* | 8/2012 | Kalavar | H04M 3/5233 379/265.06 |
| 8,386,931 B2* | 2/2013 | Guckenheimer | G06F 3/04895 715/708 |
| 8,719,706 B2* | 5/2014 | Harris | G06F 16/95 715/708 |
| 8,880,417 B2 | 11/2014 | Hamper | |
| 8,885,812 B2* | 11/2014 | Margulies | H04M 3/5232 379/265.03 |
| 9,058,515 B1 | 6/2015 | Amtrup | |
| RE46,513 E | 8/2017 | Bisbee | |
| 10,698,647 B2* | 6/2020 | Shipper | G06F 3/0482 |
| 10,853,430 B1* | 12/2020 | Gau | G06F 16/958 |
| 10,936,610 B2 | 3/2021 | Twig et al. | |
| 2001/0016825 A1* | 8/2001 | Pugliese, III | G06Q 20/0457 705/5 |
| 2002/0091993 A1* | 7/2002 | Walley | G06F 9/453 717/120 |
| 2002/0156661 A1* | 10/2002 | Jones | G06Q 10/02 705/6 |
| 2002/0174030 A1 | 11/2002 | Praisner | |
| 2003/0001875 A1* | 1/2003 | Black | G06F 9/453 715/708 |
| 2004/0098287 A1 | 5/2004 | Young | |
| 2005/0203782 A1* | 9/2005 | Smith | G06Q 10/025 705/5 |
| 2005/0256751 A1* | 11/2005 | O'Donnell | G06F 16/958 707/E17.116 |
| 2005/0288974 A1 | 12/2005 | Baranowski | |
| 2006/0053052 A1 | 3/2006 | Baggett et al. | |
| 2006/0212321 A1 | 9/2006 | Vance | |
| 2007/0282740 A1 | 12/2007 | Wendt | |
| 2007/0294116 A1* | 12/2007 | Stephens | G06Q 10/00 705/5 |
| 2008/0167908 A1 | 7/2008 | Marcken | |
| 2008/0319808 A1 | 12/2008 | Wofford | |
| 2008/0319866 A1* | 12/2008 | Papi | G06Q 30/02 705/26.1 |
| 2010/0042445 A1 | 2/2010 | Nicosia | |
| 2010/0198628 A1 | 8/2010 | Rayner | |
| 2011/0071865 A1* | 3/2011 | Leeds | G06Q 10/025 707/E17.014 |
| 2011/0225188 A1 | 9/2011 | Lopinto | |
| 2011/0251917 A1 | 10/2011 | Etzioni et al. | |
| 2011/0264501 A1 | 10/2011 | Clyne | |
| 2011/0307280 A1 | 12/2011 | Mandelbaum | |
| 2012/0117482 A1 | 5/2012 | Harinarayan | |
| 2012/0185310 A1* | 7/2012 | Greenspun | G07F 17/3255 705/14.12 |
| 2012/0209640 A1 | 8/2012 | Hamper | |
| 2012/0330906 A1 | 12/2012 | Fredericks | |
| 2013/0024493 A1* | 1/2013 | Salonen | H04L 51/214 709/202 |
| 2013/0031506 A1 | 1/2013 | Diaz | |
| 2013/0041696 A1 | 2/2013 | Richard | |
| 2013/0041902 A1 | 2/2013 | Swann | |
| 2013/0290324 A1 | 10/2013 | Gibergues | |
| 2013/0325557 A1 | 12/2013 | Ricci | |
| 2014/0074958 A1 | 3/2014 | Elliott et al. | |
| 2014/0089183 A1 | 3/2014 | Allen | |
| 2014/0143231 A1* | 5/2014 | Adari | G06F 16/957 707/769 |
| 2014/0214461 A1 | 7/2014 | Diliberto | |
| 2014/0236641 A1 | 8/2014 | Dawkins | |
| 2014/0278597 A1 | 9/2014 | Wilkinson | |
| 2014/0372866 A1 | 12/2014 | Tidhar | |
| 2015/0142482 A1 | 5/2015 | Canis | |
| 2016/0104239 A1 | 4/2016 | Johnson | |
| 2016/0260182 A1 | 9/2016 | Garman | |
| 2016/0260183 A1 | 9/2016 | Kim et al. | |
| 2016/0379142 A1* | 12/2016 | Valverde, Jr. | G06Q 10/025 705/6 |
| 2017/0293665 A1 | 10/2017 | Brodziak et al. | |
| 2018/0095565 A1 | 4/2018 | Brown | |
| 2019/0138526 A1 | 5/2019 | Wadley | |
| 2019/0139166 A1 | 5/2019 | Walker et al. | |
| 2021/0048930 A1 | 2/2021 | Chow | |
| 2021/0158333 A1 | 5/2021 | Cohen et al. | |
| 2020/1224260 | 7/2021 | Twig et al. | |
| 2021/0240724 A1 | 8/2021 | Cohen et al. | |

FOREIGN PATENT DOCUMENTS

| | | | | |
|---|---|---|---|---|
| CN | 112905178 A | * | 6/2021 | ........ G06F 40/186 |
| EP | 4065993 A1 | | 10/2022 | |
| JP | 2000348099 A | | 12/2000 | |
| KR | 20090114518 A | | 11/2009 | |
| WO | 2005079425 A2 | | 9/2005 | |
| WO | 2017215175 | | 12/2017 | |
| WO | 2021108470 A1 | | 6/2021 | |

OTHER PUBLICATIONS

International Search Report and Written Opinion dated Mar. 22, 2021, in international patent application No. PCT/US2020/062117, 7 pages.

(56) References Cited

OTHER PUBLICATIONS

International Search Report and Written Opinion dated Oct. 21, 2021, in international patent application No. PCT/US2021/040659, 8 pages.
Non-Final Office Action received in U.S. Appl. No. 17/160,646 dated Feb. 28, 2022, 52 pages.
Non-Final Rejection dated May 13, 2020, in U.S. Appl. No. 16/113,472, 22 pages.
U.S. Appl. No. 16/113,472, filed Aug. 27, 2018.
U.S. Appl. No. 17/163,862, filed Feb. 1, 2021.
U.S. Appl. No. 17/103,999, filed Nov. 25, 2020.
U.S. Appl. No. 17/160,646, filed Jan. 28, 2021.
Non-Final Office Action dated Aug. 24, 2022, in U.S. Appl. No. 17/163,862 of Ilan Ezra Twig, filed Feb. 1, 2021, 16 pages.
Non-Final Office Action dated Sep. 8, 2022, in U.S. Appl. No. 17/160,646 of Ariel Cohen, filed Jan. 28, 2021, 78 pages.

* cited by examiner

METHODS AND SYSTEMS FOR DYNAMICALLY GENERATING CONTEXTUAL USER INTERFACE ELEMENTS

CROSS-REFERENCE TO RELATED APPLICATIONS

This application claims priority from U.S. Provisional Patent Application No. 63/050,544, filed on Jul. 10, 2020, entitled "Methods and Systems for Dynamically Generating Contextual User Interface Elements," which is hereby incorporated by reference.

BACKGROUND

The disclosure relates to methods for modifying user interface elements. More particularly, the methods and systems described herein relate to functionality for dynamically generating contextual user interface elements within a user interface and, in some embodiments, establishing a connection between a first computing device associated with a user of the user interface and a second computing device associated with a contact center agent, based upon a selection by the user of the dynamically generated at least one contextual user interface element.

Conventionally, user interfaces such as those found on web pages or in mobile applications may include functionality for connecting a user to an agent (e.g., a help desk agent or other support agent at a contact center) either by phone or via on-line, text-based communications (e.g., via synchronous chat). Conventional user interfaces may include user interface elements, such as buttons, that display one of a plurality of predefined messages the user may select before connecting the user to an agent, to expedite the identification of the user's needs. Conventional user interfaces may include user interface elements that direct the user to a knowledge base article and away from the interface for text-based communication with the agent. However, such interfaces do not typically use information available about the user to dynamically create new user interface elements based on user information or the context of the user request. Typically, "canned" button interfaces provide the same text regardless of what the user is doing at the time of the request and regardless of whether the system has access to any information about the user. Typically, redirecting a user to a knowledge base does not satisfy the user's needs and conventionally serves to reduce the number of user-agent chat sessions, not to improve the quality of the user interface available to the user prior to such a session or to improve the process of identifying an agent for connection to the user where the agent has the skills necessary to help the user. In conventional systems, should a user be connected with an agent who is unable to assist the user, the agent typically communicates with an agent that does have the ability to assist the user and then reports back to the user; such a system is typically inefficient. Thus, there is a need for improved methods of generating user interface elements.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for dynamically generating contextual user interface elements. In some embodiments, the methods and systems described herein provide functionality that predicts a user's needs based on the user's interactions with a user interface (e.g., what the user views or what selections the user makes within a user interface in a web page or a mobile application) as well as based on external factors (e.g., whether the user has an existing travel reservation to a location where a storm is impacting travel), automatically retrieves reservation data selected based on an analysis of the context of the user's activity with the user interface, and leverages the retrieved data to enable skills-based routing to a support agent by pairing the identified needs determined from the interaction with the user interface (e.g., determining topics, skills required, and/or level of urgency determined from button presses made by the user in the user interface) with an optimal support agent for that user's needs, and establishing a network connection between the identified support agent and the user. The support agent may be a contact center agent, that is an individual working for a first entity that has made agents available for contact by a second entity, typically a consumer or other user of products or services made available by the first entity or an individual associated with such a user or consumer.

Figure 1A:
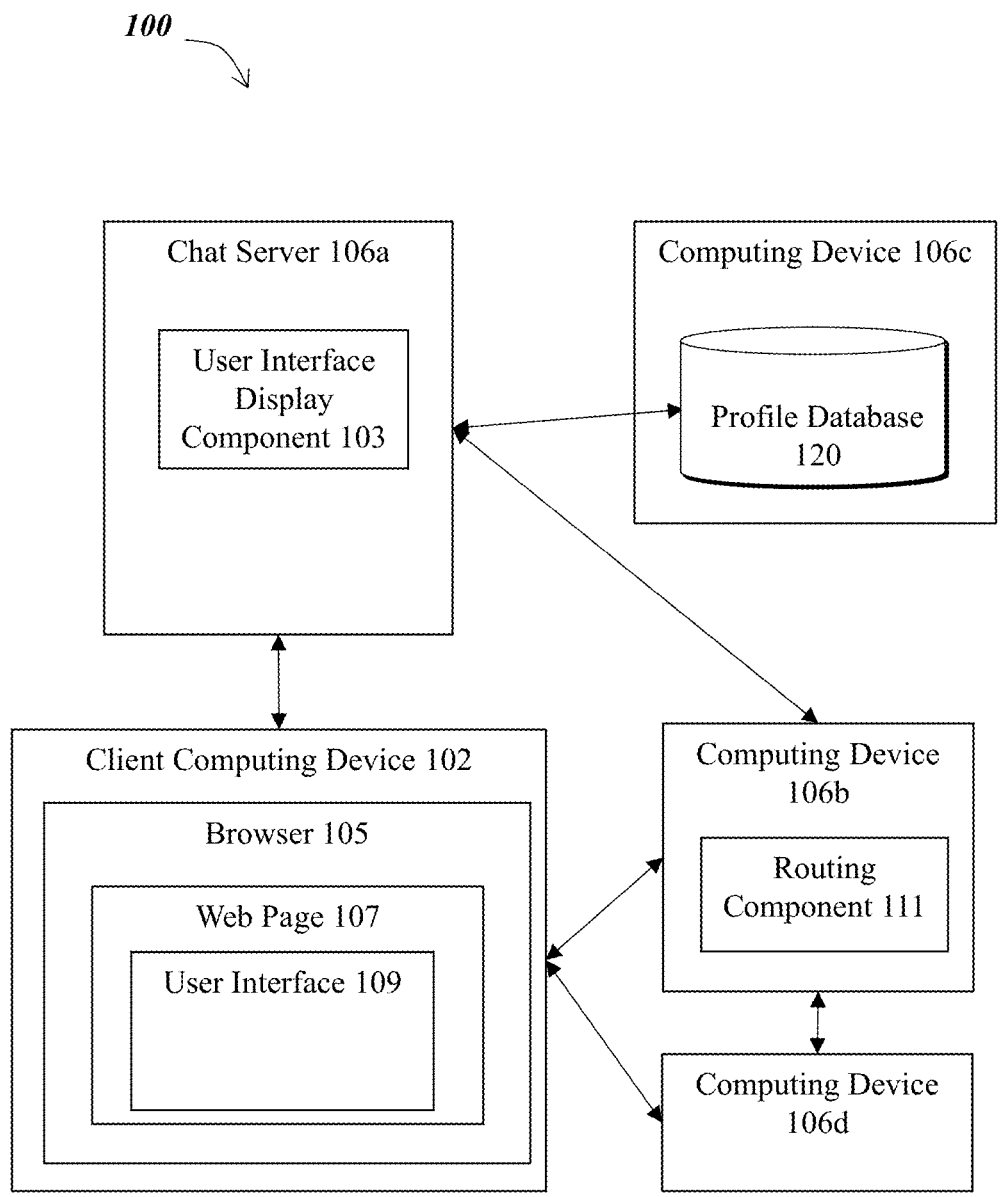
FIG. 1A is a block diagram depicting an embodiment of a system for dynamically generating contextual user interface elements.

Referring now to FIG. 1A, a block diagram depicts one embodiment of a system for dynamically generating contextual user interface elements. In brief overview, the system 100 includes a computing device 106a, a computing device 106b, a computing device 106c, a computing device 106d, a client computing device 102, a profile database 120, a user interface display component 103, a browser 105, a web page 107, a user interface 109, and a routing component 111. The computing devices 106a, 106b, 106c, 106d, and 102 may be a modified type or form of computing device (as described in greater detail below in connection with FIGS. 4A-C) that have been modified to execute instructions for providing the functionality described herein; these modifications result in a new type of computing device that provides a technical solution to problems rooted in computer technology, such as dynamically generating new user interface elements and using selection of such elements in the establishment of a chat session between users (such as, for example, between a user and a support agent).

The user interface display component 103 may be provided as a software component. The user interface display component 103 may be provided as a hardware component. The computing device 106a may execute the user interface display component 103. The user interface display component 103 may provide functionality for scanning a web page URL. The user interface display component 103 may provide functionality for retrieving data from support databases. The user interface display component 103 may provide functionality for retrieving data from the profile database 120. The user interface display component 103 may provide functionality for retrieving data from traveler reservation databases. The user interface display component 103 may provide functionality for retrieving data from alert databases. The user interface display component 103 may provide functionality for selecting a user interface element to dynamically generated based on a user interaction with a user interface. The user interface display component 103 may include, or have access to, a mapping between an identifier, such as a uniform resource locator or an identifier of a screen displayed within a mobile application, and at least one support topic. The user interface display component 103 may include, or have access to, a mapping between the at least one support topic and a user interface element.

The user interface display component 103 includes functionality for generating user interface elements for display within the user interface 109. The user interface display component 103 may provide functionality for transmitting, to the client computing device 102, data for use in rendering the generated user interface elements.

User interface elements may include buttons. User interface elements may include context buttons, which may be, for example and without limitation, buttons that display pre-composed messages on behalf of a user and that allows the system to identify, and connect the user to, a support agent. User interface elements may include a fill-in-the-blank style user interface element where the user begins typing in a sentence describing a need and the system 100 may provide auto-complete functionality to assist the user in constructing the sentence. Referring ahead to FIG. 1C, a block diagram depicts one embodiment of the user interface 109 modified to include a dynamically generated user interface element selected by the user interface display component 103. In the embodiment depicted by FIG. 1C, the user interface display component 103 determined to generate three user interface elements (buttons in this embodiment) relating to the support topics of changing a flight, changing a seat within a flight, and receiving help with payment issues. The user interface display component 103 also determined that the user interface 109 should include a description of departure and arrival cities and a flight date and time in a section of the user interface 109 displaying the dynamically generated user interface elements.

Referring back to FIG. 1A, the user interface display component 103 may include functionality for receiving, from the browser 105, an identification of a user interface element selected by a user. The user interface display component 103 may include functionality for transmitting, to the routing component 111, the identification of the user interface element selected by the user.

The routing component 111 may be provided as a software component. The routing component 111 may be provided as a hardware component. The computing device 106b may execute the routing component 111. The routing component 111 may include functionality for analyzing an identification of a user interface element selected by a user and identifying attributes mapped to the user interface element.

The routing component 111 may include, or have access to, a mapping between a user interface element and an attribute. A user of the system 100 may identify one or more attributes assigned to each user interface element available for dynamic generation. By way of example, and without limitation, a user interface element with a text label reading "Change this flight" may be mapped to an attribute related to flight changes (e.g., is this a GDS Sabre booking or a booking associated with a particular web site). An attribute may include, without limitation, an identifier of a traveler type (e.g., VIP or regular). An attribute may include, without limitation, an identifier of another attribute needed to assist users selecting that particular user interface element (e.g., a specific skill needed in order to manage flight changes). By way of example, and without limitation, attributes may include user-specific attributes (e.g., user's preferred language and account type, such as VIP, road warrior, influencer, etc.) and attributes about the booking (e.g., booking type such as car or train or hotel or flight, vendor/supplier data such as Sabre or Expedia, booking status such as canceled or delayed, booking location such as a geographic region). The routing component 111 may include, or have access to, a mapping between at least one attribute and an identification of at least one contact center agent having the at least one attribute. An administrative user of the system 100 may identify one or more contact center agents and associate each of the one or more contact center agents with at least one attribute (e.g., does this agent have the skills needed to manage a flight change for a Sabre GDS booking); the system 100 may provide a user interface to such a user with which the user may "tag" contact center agents with skills. Agent skills may include, without limitation, skills working with particular customer type (e.g., VIP, road warrior, influencer, etc.), preferred language, performable actions (e.g., flight changes, train changes, etc.), general product area knowledge (e.g., flights, hotels, trains, etc.), and agent type (e.g., new hire, mid-level, or senior).

The routing component 111 includes functionality for selecting a contact center agent for the user to contact. The routing component 111 may include functionality for establishing a connection between the user and the contact center agent. The routing component 111 may include functionality for putting the user in a queue of users waiting to speak with the contact center agent.

The client computing device 102 may execute the browser application 105. The browser application 105 may be communication with the computing device 106a to display data retrieved from the computing device 106a, resulting in rendering of the web page 107. The user interface 109 may be a component displayed by the browser 105 within the web page 107.

The computing device 106a may include or be in communication with the database 120. The database 120 may store data related to user profiles. For example, the database 120 may store data related to user information stored by the system in connection with a service provided via the user interface. As another example, in embodiments in which the system 100 provides assistance with travel-related reservations the database 120 may store data such as, and without limitation, user account data, existing travel reservation data (whether for completed or for upcoming travel reservations), and corporate data associated with the user (such as, for example and without limitation, loyalty rewards plans or corporate travel and expense policies). The database 120 may be an ODBC-compliant database. For example, the database 120 may be provided as an ORACLE database, manufactured by Oracle Corporation of Redwood Shores, Calif. In other embodiments, the database 120 may be a Microsoft ACCESS database or a Microsoft SQL server database, manufactured by Microsoft Corporation of Redmond, Wash. In other embodiments, the database 120 can be a SQLite database distributed by Hwaci of Charlotte, N.C., or a PostgreSQL database distributed by The PostgreSQL Global Development Group. In still other embodiments, the database 120 may be a custom-designed database based on an open source database, such as the MYSQL family of freely available database products distributed by Oracle Corporation of Redwood City, Calif. In other embodiments, examples of databases include, without limitation, structured storage (e.g., NoSQL-type databases and BigTable databases), HBase databases distributed by The Apache Software Foundation of Forest Hill, Md., MongoDB databases distributed by ioGen, Inc., of New York, N.Y., an AWS DynamoDB distributed by Amazon Web Services and Cassandra databases distributed by The Apache Software Foundation of Forest Hill, Md. In further embodiments, the database 120 may be any form or type of database.

Although, for ease of discussion, the user interface display component 103, the routing component 111, and the database 120 are described in FIG. 1*a* as separate modules, it should be understood that this does not restrict the architecture to a particular implementation. For instance, these components may be encompassed by a single circuit or software function or, alternatively, distributed across a plurality of computing devices.

Figure 1B:
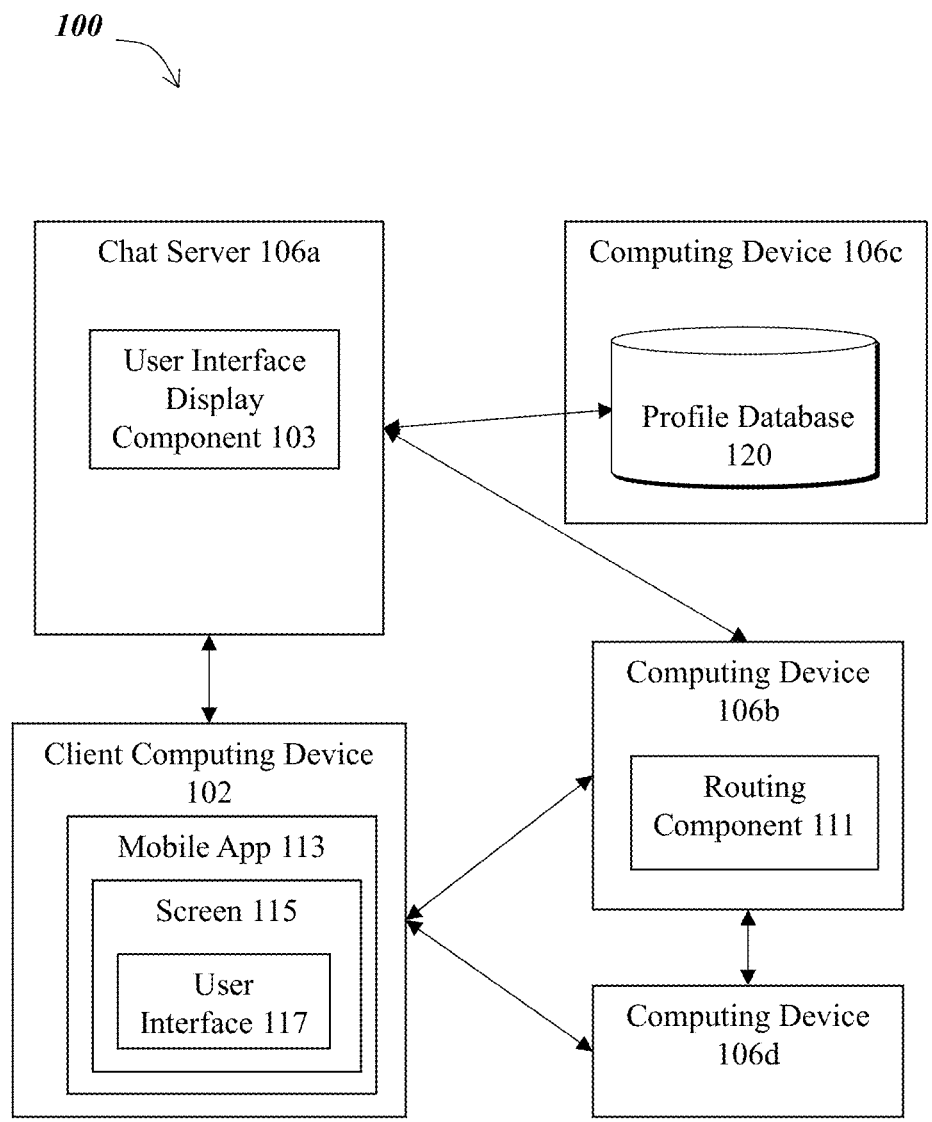
FIG. 1B is a block diagram depicting an embodiment of a system for dynamically generating contextual user interface elements.
Figure 1C:
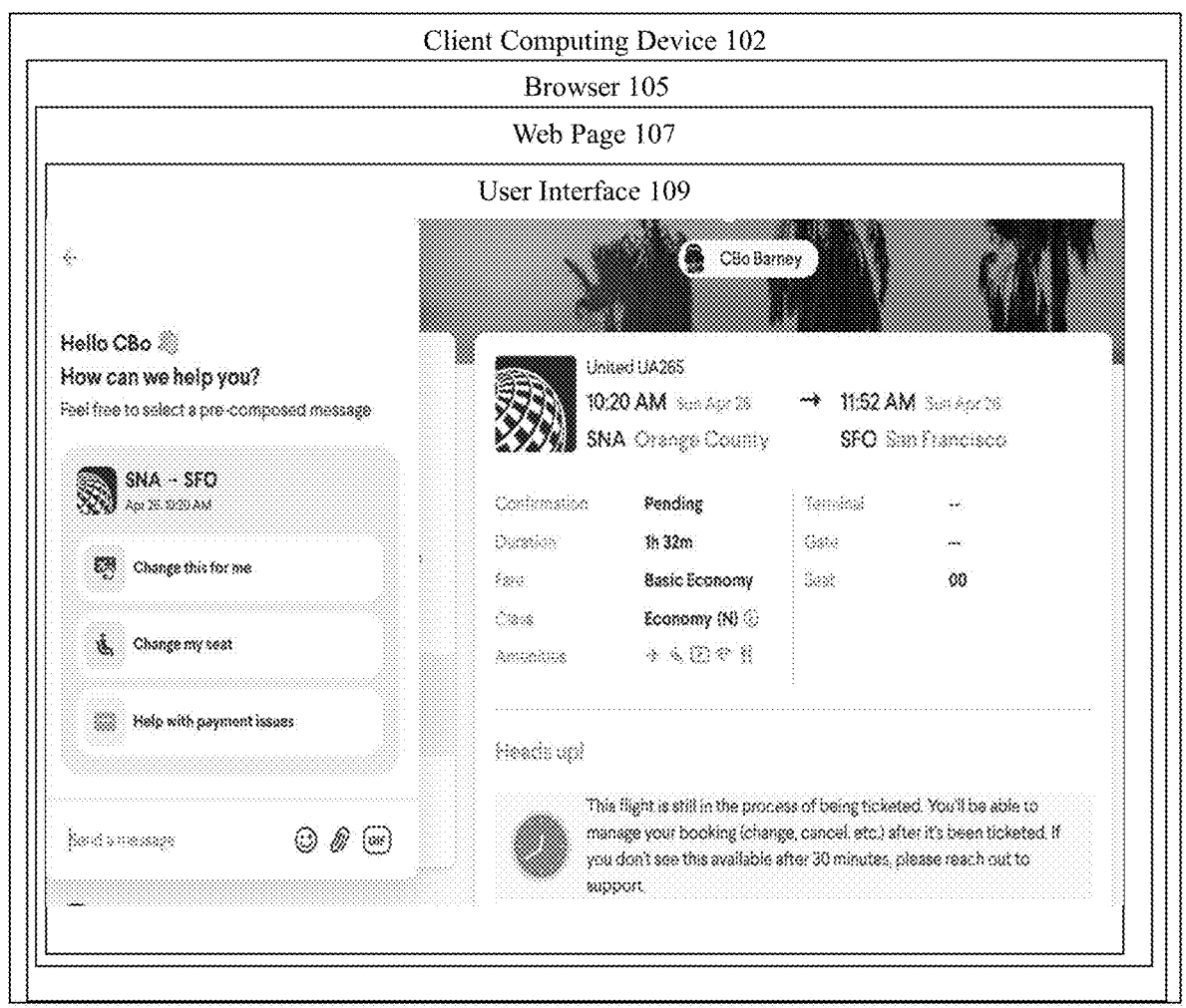
FIG. 1C is a block diagram depicting an embodiment of a system for dynamically generating contextual user interface elements.

FIG. 1B is a block diagram depicting one embodiment of the system 100 in which, instead of accessing a web page, the user accesses a mobile application executing on a computing device of the user, such as a mobile device. As depicted in FIG. 1B, the system 100 includes a computing device 106*a*, a computing device 106*b*, a client computing device 102, a profile database 120, a user interface display component 103, a mobile application 113, a screen 115 (which may also be referred to as a view 115), a user interface 117, and a routing component 111. The computing devices 106*a*, 106*b*, and 102 may be computing devices 106*a*, 106*b*, and 102 as described above in connection with FIG. 1A. The user interface display component 103 may provide the functionality of the user interface display component 103 as described above in connection with FIG. 1A. The routing component 111 may provide the functionality of the routing component 111 as described above in connection with FIG. 1A. the mobile application 113 may be a mobile app provided by an entity with which a user is seeking to interact. As will be understood by those of skill in the art, the identifier of the screen displayed by the mobile application may be referred to as a "screen", a "view", a "scene", or a "page" each of which identifies a portion of user interface within a mobile application 113 rendered on the user's device 102. The user interface 117 may provide the functionality described in connection with the user interface 109.

Figure 2A:
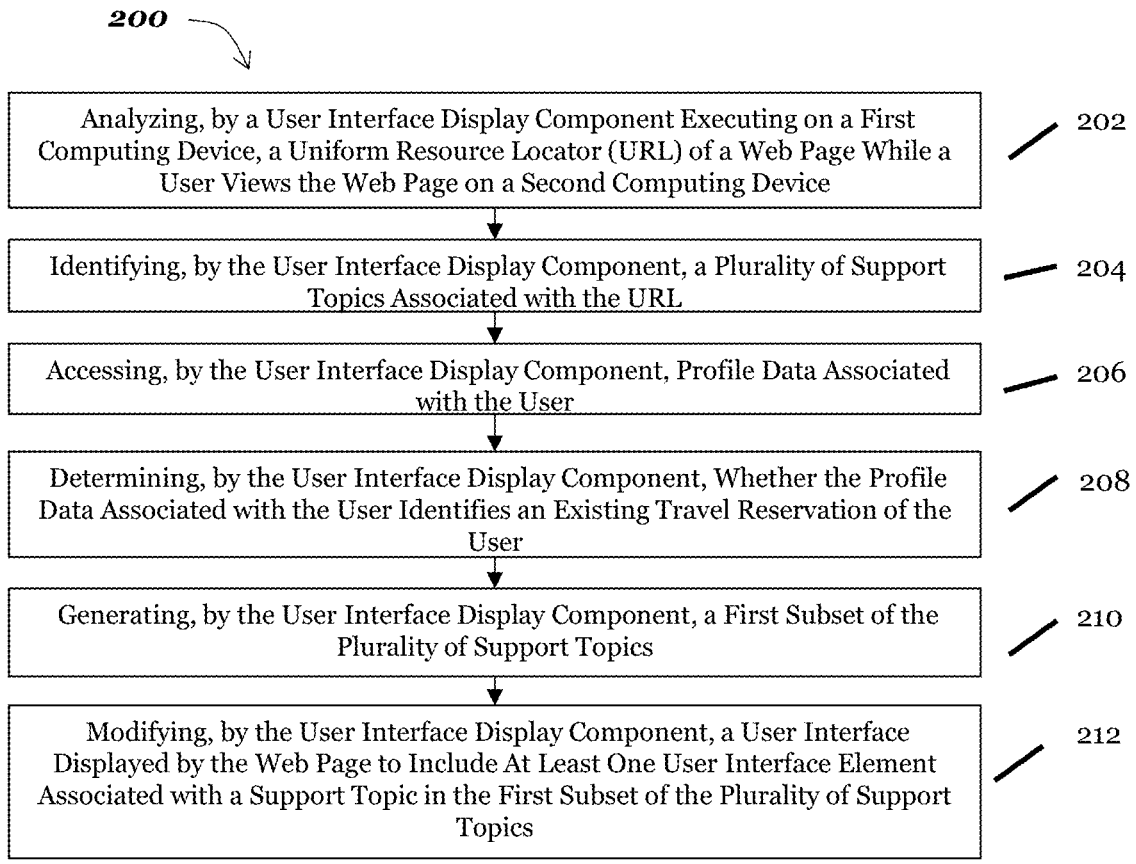
FIG. 2A is a flow diagram depicting an embodiment of a method for dynamically generating contextual user interface elements.

Referring now to FIG. 2A, in brief overview, a flow diagram depicts one embodiment of a method 200 for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method 200 includes analyzing, by a user interface display component executing on a first computing device, a uniform resource locator (URL) of a web page while a user views the web page on a second computing device (202). The method 200 includes identifying, by the user interface display component, a plurality of support topics associated with the URL (204). The method 200 includes accessing, by the user interface display component, profile data associated with the user (206). The method 200 includes determining, by the user interface display component, whether the profile data associated with the user identifies an existing travel reservation of the user (208). The method 200 includes generating, by the user interface display component, a first subset of the plurality of support topics (210). The method 200 includes modifying, by the user interface display component, a user interface displayed by the web page to include at least one user interface element associated with a support topic in the first subset of the plurality of support topics (212).

In some embodiments, the system 100 provides functionality for dynamically generating contextual user interface elements and adding those elements to a user interface (including, without limitation, generating contextual buttons and adding those buttons to a chat interface).

Referring now to FIG. 2A, in greater detail and in connection with FIG. 1, the method 200 includes analyzing, by a user interface display component executing on a first computing device, a uniform resource locator (URL) of a web page while a user views the web page on a second computing device (202). In one embodiment, the browser 105 to transmit the URL to the user interface display component 103. In one embodiment, when the user interacts with a portion of the user interface 109 that results in a modification to the URL, the browser 105 transmits the URL to the chat server 106*a*; this allows for user interface elements in the user interface 109 to be updated and/or dynamically generated when the user accesses a portion of the user interface 109 associated with a connecting to a contact center agent. In some embodiments, the browser 105 requests display logic on page load but also transmits the URL during on-screen events that modify the URL (e.g., clicking on a particular flight in an itinerary may not load a new page but may modify the URL); with the modified URL, the system 100 determines that the user is accessing a specific type of data or specific section of the user interface 109 and update the user interface elements accordingly.

The method 200 includes identifying, by the user interface display component, a plurality of support topics associated with the URL (204). The user interface display component 103 may access a mapping between the URL and the plurality of support topics. By way of example, and without limitation, the user interface display component 103 may access a data structure (such as a table) that maps URLs to one or more support topics.

The method 200 includes accessing, by the user interface display component, profile data associated with the user (206). The user interface display component 103 may access the profile database 120 to retrieve profile data associated with the user. In some embodiments, a user has logged in to an account provided by the system 100 and the user interface display component 103 may access profile data associated with the user (or request access to such data) using the unique user identifier associated with the user's account. In other embodiments, biometric data may be used to identify a user and identify the user's associated profile data.

The method 200 includes determining, by the user interface display component, whether the profile data associated with the user identifies an existing travel reservation of the user (208). The profile data associated with the user may identify an existing travel reservation for an upcoming travel reservation. The profile data associated with the user may identify an existing travel reservation for a past travel reservation. The profile data associated with the user may identify an existing travel reservation for a travel reservation the user is currently using (e.g., the user may be midway through a hotel stay). The user interface display component 103 may request profile data indicating whether the user is associated with an existing travel reservation from the computing device 106c. The computing device 106c may periodically check for updates to these trips from external, third party sources (e.g., delay and cancelation information) and may automatically update the profile data associated with the user with that trip information. When the user interface display component 103 requests profile data associated with the user, the trips and the status of the trips (if any) is included in the response. In some embodiments, the user identifier associated with the user's account in the system 100 is used to request information about upcoming trips and the URL is used to focus the search (for example, if the user is reviewing an itinerary for a specific trip, a unique identifier of that trip is included in the URL and the request may be specifically made for information associated with that trip).

The method 200 includes generating, by the user interface display component, a first subset of the plurality of support topics (210). The user interface display component 103 may use profile data associated with the user to filter the plurality of support topics. By way of example, the user interface display component 103 may identify a plurality of support topics associated with making changes to existing flights based on a determination that the user is viewing a portion of the web page that relates to an existing flight; the user interface display component 103 may then filter out any of the support topics that do not relate to changes to flight amenities for upcoming flights if profile data associated with the user suggests that, for example, the user has a preference for a particular type of seat or cabin class that is different than what is assigned for the existing flight the user is viewing (e.g., keeping support topics related to changing seat assignments and filtering out support topics on canceling a flight). As one example, when a user is accessing a home page of the system 100, the user may need support with managing trips (canceling or changing trips) but if the user has no trips booked, they are more likely to need support booking a new trip and the system can determine the likelihood of the user needing one support topic instead of another; for new users, the system might determine that the user may need support in using the site, in learning about travel policies (e.g., for corporate travel), or in learning how to redeem their loyalty rewards. Based on how long a user has accessed data about a particular product or portion of a user interface, whether or not the user has any bookings associated with their profile, and the status of those bookings, the system 100 may dynamically generate and modify the user interface elements displayed to the user. As another example, relating to flight itinerary details, if a user is accessing data associated with a flight within an itinerary, there are many potential user interface elements that could be shown, the most common of which would be for assistance with a flight change (particularly if a flight is delayed or canceled or in less than a threshold period of time); however, for a flight with an on-time departure and within the check-in window, the user might want help checking in, learning about the baggage policy for the flight, or getting a new seat—unless the flight is on an open seating airline (such as Southwest) in which case seat selection assistance is not a relevant support topic. Continuing with this example, after the flight is past, information about flight changes, cancelations, check-ins, or baggage is not relevant to the user but they may need help with an invoice for a seat upgrade requested at the gate. Throughout the user's journey, the logic of what to display in the user interface elements offering support to the user is periodically updated as the system 100 determines what support topics are more useful to the user.

The user interface display component 103 may determine that the profile data associated with the user includes an identification of an existing travel reservation of the user. The user interface display component 103 may identify a status of the existing travel reservation. The user interface display component 103 may filter the first subset of the plurality of support topics based upon the identified status, generating a second subset of the plurality of support topics. The user interface display component 103 may determine that the profile data associated with the user includes an identification of an existing travel reservation of the user. For example, the user has an existing travel reservation that has been delayed or modified, the user interface display component 103 may further filter the support topics.

The user interface display component 103 may access a third-party database storing data associated with the existing travel reservation of the user. The user interface display component 103 may filter the first subset of the plurality of support topics based upon the identified status, generating a second subset of the plurality of support topics. For example, if a third-party database indicates that there is a storm impacting a region to which the user had planned to travel, the user interface display component may further filter the support topics accordingly.

The user interface display component 103 may select one or more user interface elements to display, each of which is associated with at least one of the support topics in the subset of the plurality of support topics. The user interface display component 103 may access a mapping between support topics and user interface elements to make the selection.

The methods and systems described herein may provide functionality for combining user data generated by the system 100 (e.g., booking details) with externally created, third party data (e.g., flight status information published by an airline instead of generated by the system 100) to determine what a user is likely to need help with and then generating the user interface elements that link the user to support directed to that determined support topic.

The method 200 includes modifying, by the user interface display component, a user interface displayed by the web page to include at least one user interface element associated with a support topic in the first subset of the plurality of support topics (212). The button display component 103 may transmit, to the browser 105 on the client computing device 102, an enumeration of user interface elements to display and data for displaying the enumerated user interface elements within the user interface 109. The browser 105 may then modify the user interface to include a rendering of the user interface element. The modification may be made to a portion of the user interface associated with a communications session (e.g., to a chat box area of the user interface).

The user interface display component 103 may also direct the modification of the user interface to include a display of a subset of the data associated with the existing travel reservation. For example, the user interface display component 103 may instruct the browser 105 to add a flight number retrieved from the profile database to the user interface 109.

Figure 2B:
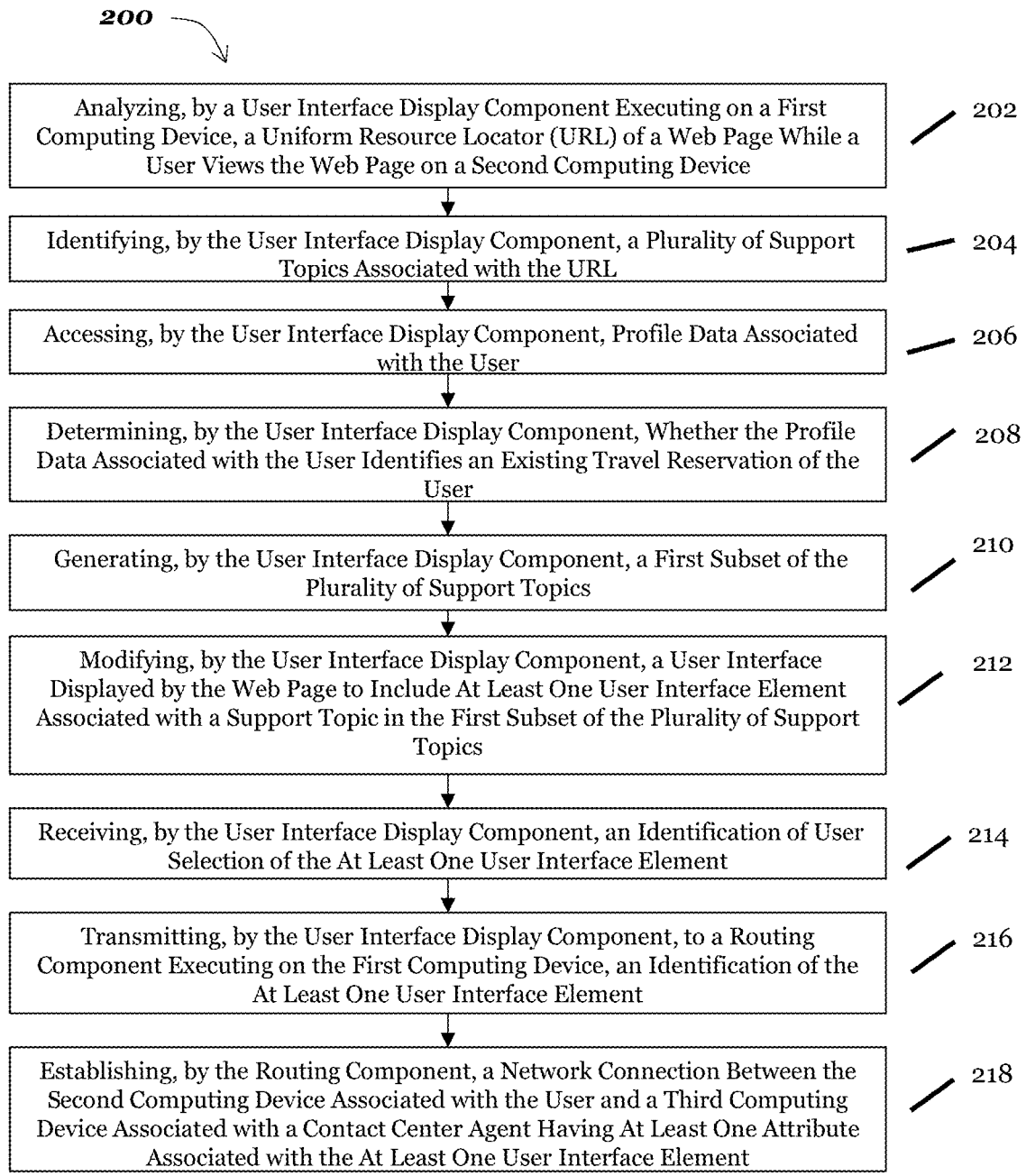
FIG. 2B is a flow diagram depicting an embodiment of a method for dynamically generating contextual user interface elements.

Referring now to FIG. 2B, in brief overview, a flow diagram depicts one embodiment of a method 200 for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method 200 includes analyzing, by a user interface display component executing on a first computing device, a uniform resource locator (URL) of a web page while a user views the web page on a second computing device (202). The method 200 includes identifying, by the user interface display component, a plurality of support topics associated with the URL (204). The method 200 includes accessing, by the user interface display component, profile data associated with the user (206). The method 200 includes determining, by the user interface display component, whether the profile data associated with the user identifies an existing travel reservation of the user (208). The method 200 includes generating, by the user interface display component, a first subset of the plurality of support topics (210). The method 200 includes modifying, by the user interface display component, a user interface displayed by the web page to include at least one user interface element associated with a support topic in the first subset of the plurality of support topics (212). The method 200 includes receiving, by the user interface display component, an identification of user selection of the at least one user interface element (214). The method 200 includes transmitting, by the user interface display component, to a routing component executing on the first computing device, an identification of the at least one user interface element (216). The method 200 includes establishing, by the routing component, a network connection between the second computing device associated with the user and a third computing device associated with a contact center agent having at least one attribute associated with the at least one user interface element (218).

In some embodiments, (202), (204), (206), (208), (210), and (212) may execute as described above in connection with FIG. 2A.

The method 200 includes receiving, by the user interface display component, an identification of user selection of the at least one user interface element (214). The method 200 includes transmitting, by the user interface display component, to a routing component executing on the first computing device, an identification of the at least one user interface element (216).

The method 200 includes establishing, by the routing component, a network connection between the second computing device associated with the user and a third computing device associated with the identified contact center agent (218). The third computing device may be the computing device 106d. The routing component 111 may establish a connection over which the user and the contact center may conduct a text-based "chat" session. By way of example, and without limitation, the chat server 106a may provide the routing component 111 with the information about the user and the selected user interface element with a request to connect the user to a contact center agent; upon identifying a contact center agent and determining the agent is available to assist with the user, the routing component 111 may transmit a notification to the identified agent and when the agent accepts the task of connecting with the user, the routing component 111 creates an active communication channel between the user and the agent, allowing the two parties to communicate. Alternatively, the routing component 111 may establish a connection over which the user and the contact center agent may conduct a voice-based "phone" conversation (whether conducted via conventional phone calls, Voice over IP calls, cell phone calls, video calls, or other voice-based exchange).

Figure 2C:
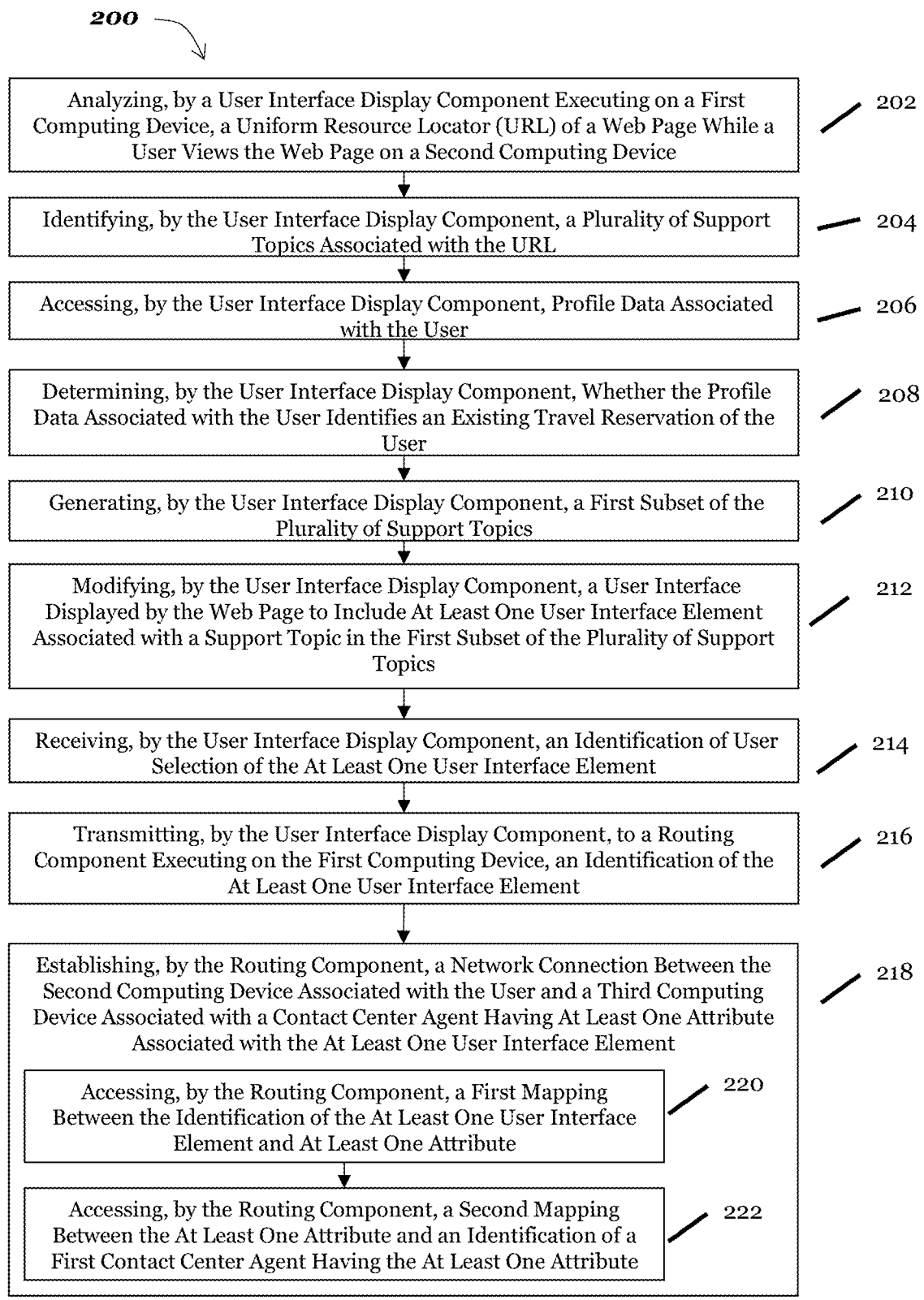
FIG. 2C is a flow diagram depicting an embodiment of a method for dynamically generating contextual user interface elements.

Referring now to FIG. 2C, in brief overview, a flow diagram depicts one embodiment of a method 200 for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method 200 includes analyzing, by a user interface display component executing on a first computing device, a uniform resource locator (URL) of a web page while a user views the web page on a second computing device (202). The method 200 includes identifying, by the user interface display component, a plurality of support topics associated with the URL (204). The method 200 includes accessing, by the user interface display component, profile data associated with the user (206). The method 200 includes determining, by the user interface display component, whether the profile data associated with the user identifies an existing travel reservation of the user (208). The method 200 includes generating, by the user interface display component, a first subset of the plurality of support topics (210). The method 200 includes modifying, by the user interface display component, a user interface displayed by the web page to include at least one user interface element associated with a support topic in the first subset of the plurality of support topics (212). The method 200 includes receiving, by the user interface display component, an identification of user selection of the at least one user interface element (214). The method 200 includes transmitting, by the user interface display component, to a routing component executing on the first computing device, an identification of the at least one user interface element (216). The method 200 includes establishing, by the routing component, a network connection between the second computing device associated with the user and a third computing device associated with a contact center agent having at least one attribute associated with the at least one user interface element (218). The establishment of the network connection (218), as depicted in FIG. 2C, includes accessing, by the routing component executing on the first computing device, a first mapping between the identification of the at least one user interface element and at least one attribute (220) and includes accessing, by the routing component, a second mapping between the at least one attribute and an identification of a first contact center agent having the at least one attribute (222).

The method 200 includes accessing, by the routing component, a first mapping between the identification of the at least one user interface element and at least one attribute (220). The identification of the at least one user interface element may include information such as a purpose of the request or an identifier of an airline and the routing component 111 may identify an attribute associated with each item of information received with the identification of the at least one user interface element. For example, and without limitation, the routing component 111 may receive the following text: "Name: JDoe/Type: VIP/Language: English/ Purpose: Flight Booking/Additional Data: [Airline:Southwest, FlightNumber: WN 1315, Dates: July 20-July 25]" and the routing component 111 may access one or more mappings for each of those pieces of information and determine to identify an agent who has attributes including skilled for the purpose of flight booking and skilled at managing Southwest flight bookings and skilled at supporting VIP users.

The method 200 includes accessing, by the routing component, a second mapping between the at least one attribute and an identification of a first contact center agent having the at least one attribute (222). The routing component 111 uses the attributes identified from the identification of the at least one user interface element to identify the first contact center agent. The routing component 111 may have a threshold amount of time in which to identify the first contact center agent and determine whether the first contact center agent is available (e.g., the routing component 111 may have 20 seconds to identify an available agent satisfying all the attributes). In the event that the routing component 111 does not identify the first contact center agent, or does not do so within a requisite period of time, the routing component 111 may remove one of the attributes in the list of attributes desired in a contact center agent. If the routing component 111 had unsuccessfully searched for an agent who had attributes including skilled for the purpose of flight booking and skilled at managing Southwest flight bookings and skilled at supporting VIP users, the routing component 111 may determine to remove the attributed of being skilled at managing Southwest flight bookings, searching instead for an agent who had attributes including skilled for the purpose of flight booking and skilled at supporting VIP users; if that search is also unsuccessful, the routing component 111 may then search for an agent who had attributes including skilled at supporting VIP users. If the routing component 111 cannot identify a contact center agent having any of the attributes, the routing component 111 may identify any available contact center agent.

Before establishing the network connection, the routing component 111 may determine whether the identified first contact center agent is available to conduct a communications session with the user. The routing component 111 may determine whether a value of an agent state identifier indicates that the identified first contact center agent is available (e.g., determining whether the agent is working at the moment or on break). The routing component 111 may determine whether a value of an agent capacity identifier indicates that the identified first contact center agent is available (e.g., whether the agent is already conducting a number of communications sessions with other users that exceeds a threshold number of communications sessions allowed per agent; for example, a threshold may specify that an agent may conduct two text-based chat sessions or one phone call).

The routing component 111 may determine that the identified first contact center agent is unavailable to conduct a communications session with the user. If the first contact center agent is unavailable, the routing component 111 may identify a second contact center agent having the at least one attribute (e.g., by accessing a second mapping between the at least one attribute and the second contact center agent) and that the identified second contact center agent is available for a communications session with the user; the routing component 111 may then establish the network connection between the second computing device associated with the user and a fourth computing device associated with the identified second contact center agent. The second contact center agent may not have the at least one attribute. The second contact center agent may be associated with an attribute that is a super set of an attribute set containing the at least one attribute; for example, the at least one attribute may have specified that a contact center agent helping a particular user should have experience in performing flight changes for flights provided by a particular airline and the second contact center agent may not have that specific skill but may be skilled at performing flight changes for users.

Upon determining that an identified contact center agent is available for a communications session with the user, the routing component 111 may provide, to the identified contact center agent, a subset of the data associated with the existing travel reservation. The routing component 111 may apply one or more rules to the data associated with the existing travel reservation to determine whether to provide a portion of the data to the identified contact center agent. By way of example, and without limitation, a rule may specify that the routing component 111 should provider the agent with an identification of whether a flight is delayed or canceled. As another example, a rule may specify that the routing component 111 should provider the agent with a booking identifier or other identifier the agent can use to retrieve booking data, including user profile data and one or more tools to service that booking. As a further example, a rule may specify that the routing component 111 should provider the agent with one or more phone numbers relevant to assisting the user, such as, without limitation, hotel phone numbers, vendor phone numbers, ticketing airline phone numbers and/or airline ticket vendor phone numbers.

In summary, to determine which buttons to show, the system 100 may predict a user's needs by analyzing a URL identifying where the user is in a user interface (e.g., are they on a checkout page or a search page?) and matching this URL with support invocation data to identify the most common support needs for the chats that are initiated from that URL, filtering those common support requests by what the user has booked (or is in the process of booking) and eliminating those support requests that are not relevant to the user (e.g., support for changing an existing hotel reservation would not be relevant to a user who does not have an existing hotel reservation), and increasing a level of likelihood that a user will need those topics that are more likely to be relevant based on a status of the user's booking (e.g., if the user has an existing reservation for a flight that was recently delayed by three hours, the probability that they are reaching out about a flight change increases and thus support topics related to flight changes are more likely to be relevant to the user). Continuing with this summary, the system 100 associates attributes with each of the user interface elements available for generation and adding to a user interface so that when the user clicks on one of the user interface elements, the system 100 can determine which attributes a support agent should have in order to provide optimal support to that user, as well as to understand the topic of interest to the user, the skills required, and the level of urgency (e.g., are they traveling right now, did their flight just get canceled, are they two weeks away from the start of travel and wondering if they have reserved a non-smoking room, etc.). By selecting user interface elements chosen based on what a user is doing in a user interface element (instead of, for example, providing only canned responses or redirections to knowledge bases or performing natural language processing on user-provided text-based input), the methods and systems described herein may provide data-driven choices to a user and then connect the user with the appropriate agent based on the user's selection. By making decisions for selecting agents and connecting agents and users based on user behavior within a user interface and system data about the user, the methods and systems described herein provide improved functionality for connecting users with what they need instead of parsing the user's language, which may shorten the handle time for each agent-user interaction without putting a burden on the user.

Figure 3A:
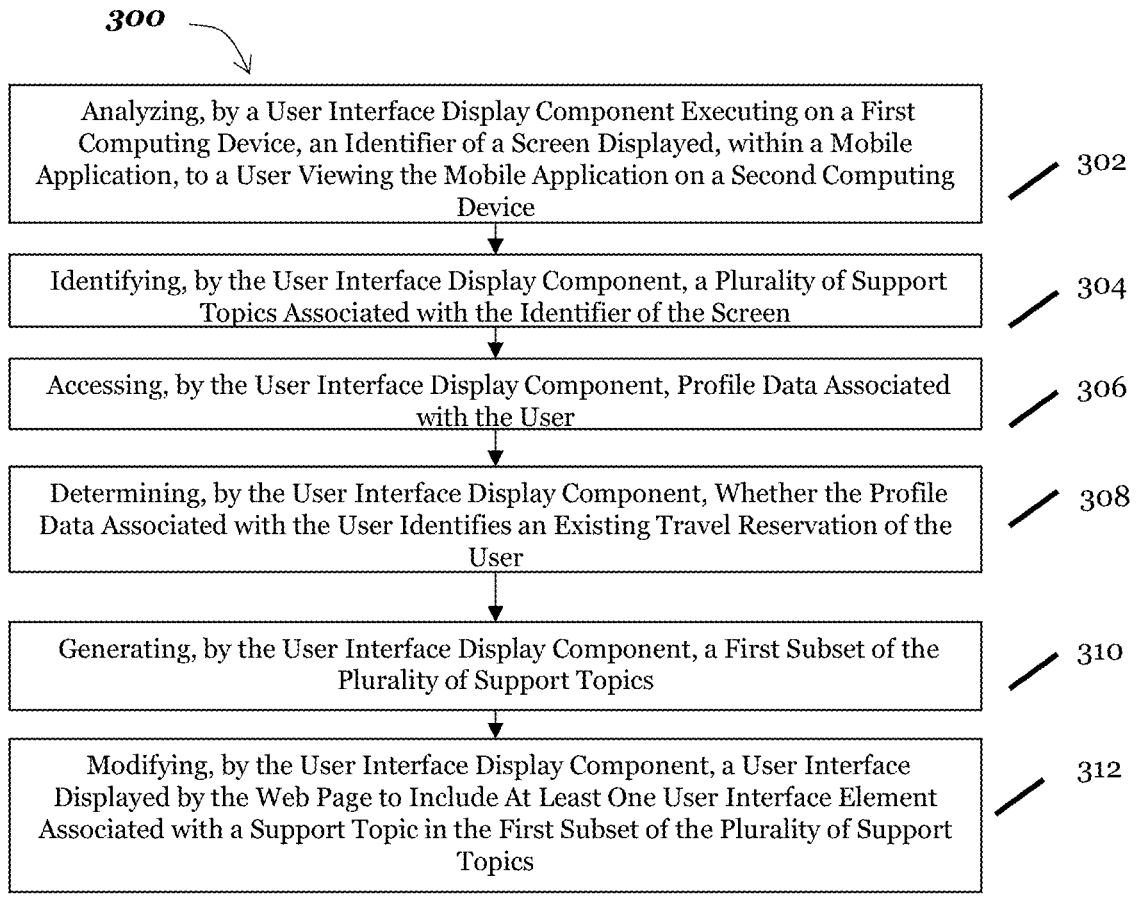
FIG. 3A is a flow diagram depicting an embodiment of a method for dynamically generating contextual user interface elements.

Referring now to FIG. 3A, in brief overview, a flow diagram depicts one embodiment of a method 300 for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method 300 includes analyzing, by a user interface display component executing on a first computing device, an identifier of a screen displayed, within a mobile application, to a user viewing the mobile application on a second computing device (302). The method 300 includes identifying, by the user interface display component, a plurality of support topics associated with the identifier of the screen (304). The method 300 includes accessing, by the user interface display component, profile data associated with the user (306). The method 300 includes determining, by the user interface display component, whether the profile data associated with the user identifies an existing travel reservation of the user (308). The method 300 includes generating, by the user interface display component, a first subset of the plurality of support topics (310). The method 300 includes modifying, by the user interface display component, a user interface displayed by the web page to include at least one user interface element associated with a support topic in the first subset of the plurality of support topics (312).

Referring to FIG. 3A in greater detail, and in connection with FIGS. 2A-2C, the method 300 includes analyzing, by a user interface display component executing on a first computing device, an identifier of a screen displayed, within a mobile application, to a user viewing the mobile application on a second computing device (302). As one example, an identifier may be "home".

The method 300 includes identifying, by the user interface display component, a plurality of support topics associated with the identifier of the screen (304). The user interface display component 103 may identify the plurality of support topics as described above in connection with FIG. 2 and identifying the plurality of support topics associated with the URL. In some embodiments, the user interface display component 103 identifies a device parameter (e.g., web, iOS, and Android) within the received identifier of the screen and identify a plurality of support topics associated with the device parameter.

The method 300 includes accessing, by the user interface display component, profile data associated with the user (306). The user interface display component 103 may access the profile data as described above in connection with FIG. 2A, (206).

The method 300 includes determining, by the user interface display component, whether the profile data associated with the user identifies an existing travel reservation of the user (308). The user interface display component 103 may determine whether the profile data associated with the user identifies an existing travel reservation of the user as described above in connection with FIG. 2A, (208).

The method 300 includes generating, by the user interface display component, a first subset of the plurality of support topics (310). The user interface display component 103 may generate the first subset of the plurality of support topics as described above in connection with FIG. 2A, (210).

The method 300 includes modifying, by the user interface display component, a user interface displayed by the web page to include at least one user interface element associated with a support topic in the first subset of the plurality of support topics (312). The user interface display component 103 may modify the user interface as described above in connection with FIG. 2A, (212).

Figure 3B:
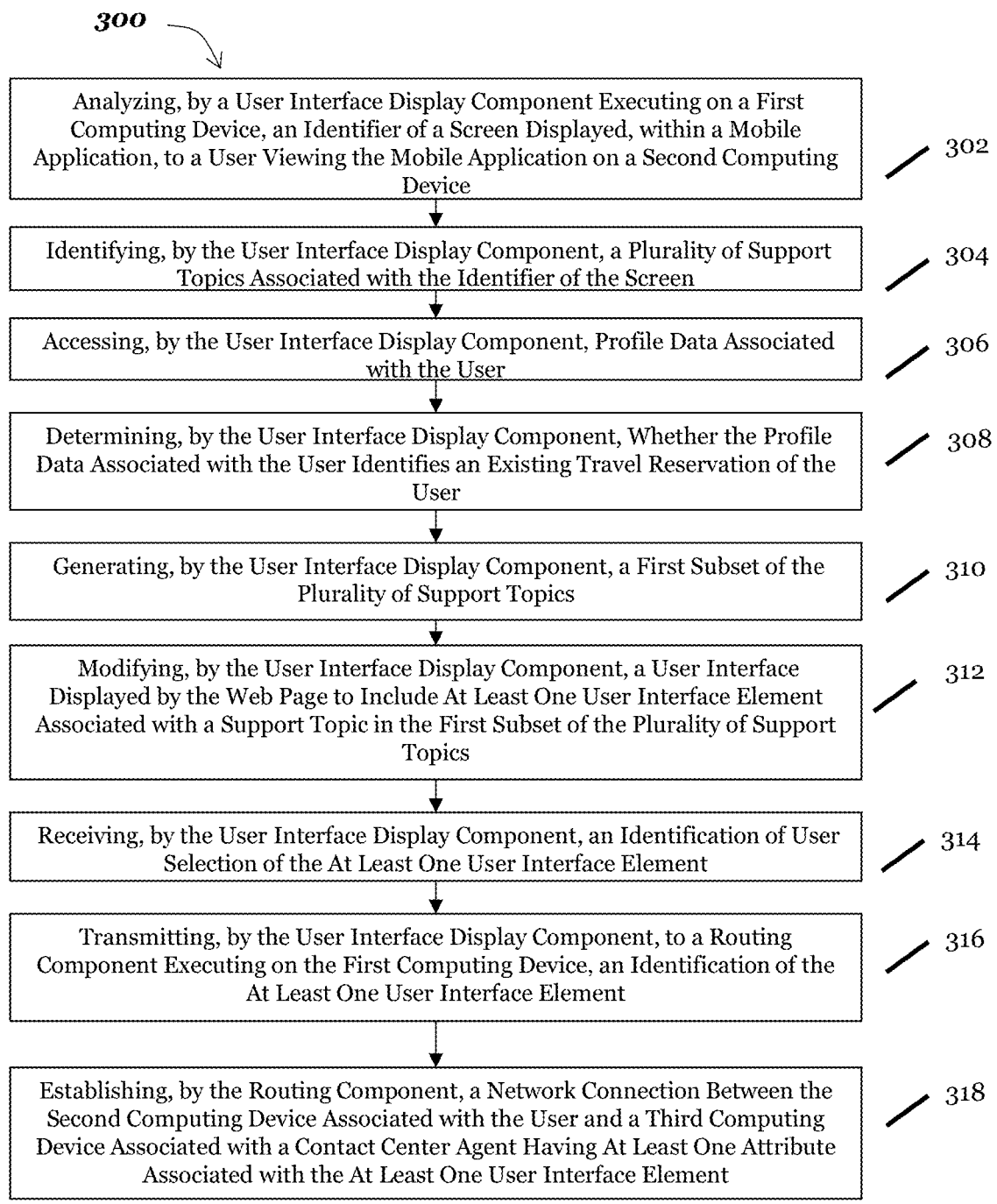
FIG. 3B is a flow diagram depicting an embodiment of a method for dynamically generating contextual user interface elements.

Referring now to FIG. 3B, in brief overview, a flow diagram depicts one embodiment of a method 300 for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method 300 includes analyzing, by a user interface display component executing on a first computing device, an identifier of a screen displayed, within a mobile application, to a user viewing the mobile application on a second computing device (302). The method 300 includes identifying, by the user interface display component, a plurality of support topics associated with the identifier of the screen (304). The method 300 includes accessing, by the user interface display component, profile data associated with the user (306). The method 300 includes determining, by the user interface display component, whether the profile data associated with the user identifies an existing travel reservation of the user (308). The method 300 includes generating, by the user interface display component, a first subset of the plurality of support topics (310). The method 300 includes modifying, by the user interface display component, a user interface displayed by the web page to include at least one user interface element associated with a support topic in the first subset of the plurality of support topics (312). The method 300 includes receiving, by the user interface display component, an identification of user selection of the at least one user interface element (314). The method 300 includes transmitting, by the user interface display component, to a routing component executing on the first computing device, an identification of the at least one user interface element (316). The method 300 includes establishing, by the routing component, a network connection between the second computing device associated with the user and a third computing device associated with the identified contact center agent (318).

In some embodiments, (302), (304), (306), (308), (310), and (312) may execute as described above in connection with FIG. 3A.

The method 300 includes receiving, by the user interface display component, an identification of user selection of the at least one user interface element (314). The user interface display component 103 may receive the identification as described above in connection with FIG. 2B, (214).

The method 300 includes transmitting, by the user interface display component, to a routing component executing on the first computing device, an identification of the at least one user interface element (316). The user interface display component 103 may transmit the identification as described above in connection with FIG. 2B, (216).

The method 300 includes establishing, by the routing component, a network connection between the second computing device associated with the user and a third computing device associated with the identified contact center agent (318). The routing component 111 may establish the network connection as described above in connection with FIG. 2B, (218).

Figure 3C:
FIG. 3C is a flow diagram depicting an embodiment of a method for dynamically generating contextual user interface elements.

Referring now to FIG. 3C, in brief overview, a flow diagram depicts one embodiment of a method 300 for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method 300 includes analyzing, by a user interface display component executing on a first computing device, an identifier of a screen displayed, within a mobile application, to a user viewing the mobile application on a second computing device (302). The method 300 includes identifying, by the user interface display component, a plurality of support topics associated with the identifier of the screen (304). The method 300 includes accessing, by the user interface display component, profile data associated with the user (306). The method 300 includes determining, by the user interface display component, whether the profile data associated with the user identifies an existing travel reservation of the user (308). The method 300 includes generating, by the user interface display component, a first subset of the plurality of support topics (310). The method 300 includes modifying, by the user interface display component, a user interface displayed by the web page to include at least one user interface element associated with a support topic in the first subset of the plurality of support topics (312). The method 300 includes receiving, by the user interface display component, an identification of user selection of the at least one user interface element (314). The method 300 includes transmitting, by the user interface display component, to a routing component executing on the first computing device, an identification of the at least one user interface element (316). The method 300 includes establishing, by the routing component, a network connection between the second computing device associated with the user and a third computing device associated with a contact center agent having at least one attribute associated with the at least one user interface element (318). The establishment of the network connection (318) as depicted in FIG. 3C includes accessing, by the routing component executing on the first computing device, a first mapping between the identification of the at least one user interface element and at least one attribute (320) and includes accessing, by the routing component, a second mapping between the at least one attribute and an identification of a first contact center agent having the at least one attribute (322).

The method 300 includes accessing, by the routing component executing on the first computing device, a first mapping between the identification of the at least one user interface element and at least one attribute (320). The routing component 111 may access the first mapping as described above in connection with FIG. 2C, (220).

The method 300 includes accessing, by the routing component, a second mapping between the at least one attribute and an identification of a first contact center agent having the at least one attribute (322). The routing component 111 may access second first mapping as described above in connection with FIG. 2C, (222).

In one embodiment, a method for dynamically generating at least one contextual user interface element within a user interface and establishing a connection between a first computing device associated with a user of the user interface and a second computing device associated with a contact center agent, based upon a selection by the user of the dynamically generated at least one contextual user interface element. The method includes analyzing, by a user interface display component executing on a first computing device, a uniform resource locator (URL) of a web page while a user views the web page on a second computing device. The method includes accessing, by the user interface display component, profile data associated with the user. The method 200 includes determining, by the user interface display component, whether the data associated with the user identifies an existing travel reservation of the user. The method 200 includes identifying, by the user interface display component, a plurality of support topics associated with the URL. The method 200 includes modifying, by the user interface display component, a user interface displayed by the web page to include at least one user interface element associated with a support topic in the plurality of support topics. That is, in contrast to the embodiments described above in connection with FIGS. 2A-2C and 3A-3C, in which an initial set of support topics is identified based on a page identifier or a screen identifier and is later filtered down to a smaller subset, in an alternative embodiment, the method may include using the page identifier and the data associated with the user to create a single list of support topics which may then be displayed to the user (or for which associated user interface elements may be displayed to the user).

Therefore, although described above in connection with dynamically generating at least one contextual user interface element within a user interface provided within a web browser application, the methods and systems described herein may also dynamically generate at least one contextual user interface element within a user interface provided within a mobile application (e.g., an application executing on a smart phone or other handheld computing device).

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 2A-C and FIGS. 3A-C.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1)

including at least one A, (2) including at least one B, (3) including either A or B, or (4) including both at least one A and at least one B.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
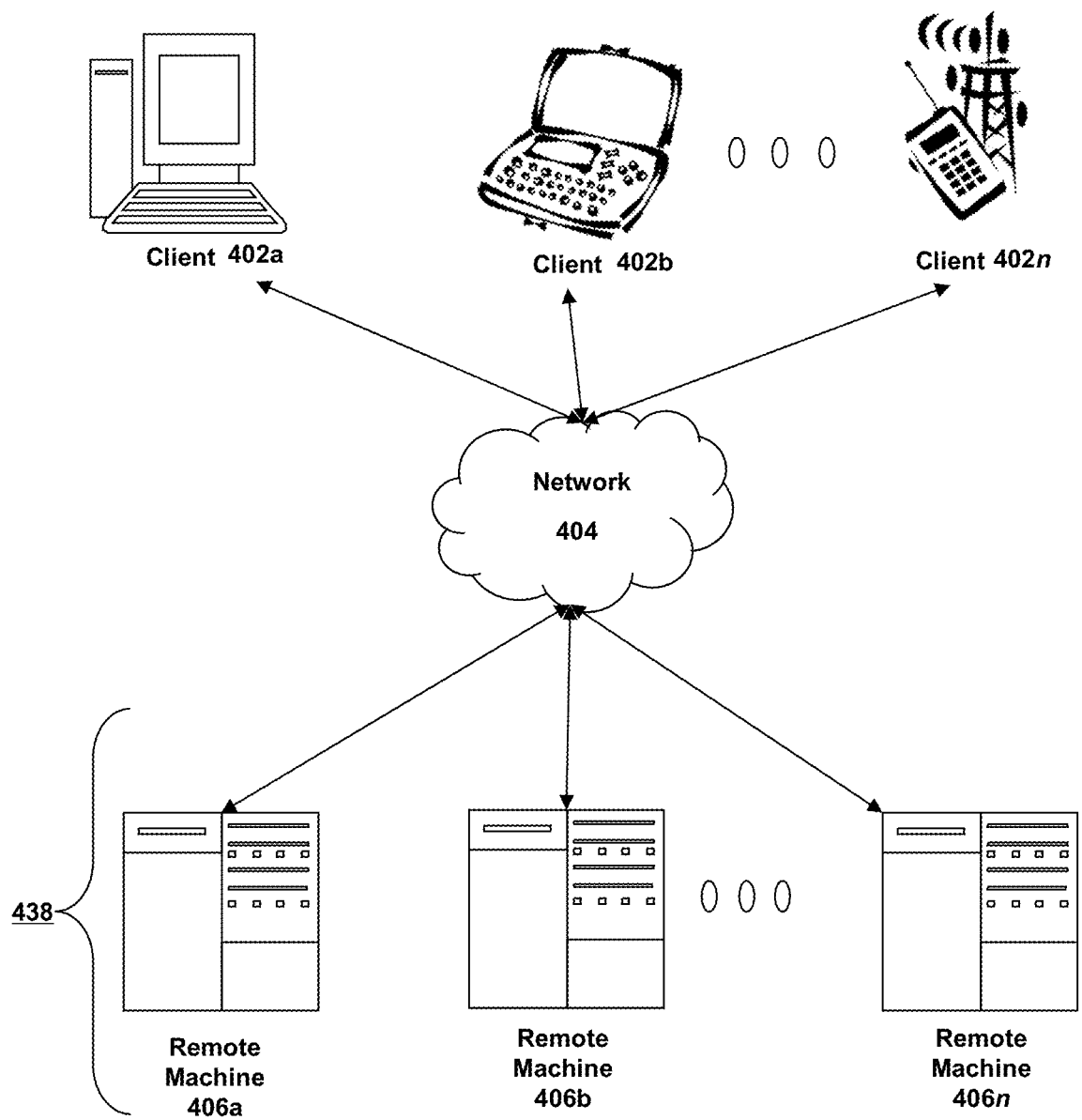
FIGS. 4A-4C are block diagrams depicting embodiments of computers useful in connection with the methods and systems described herein.
Figure 4B:
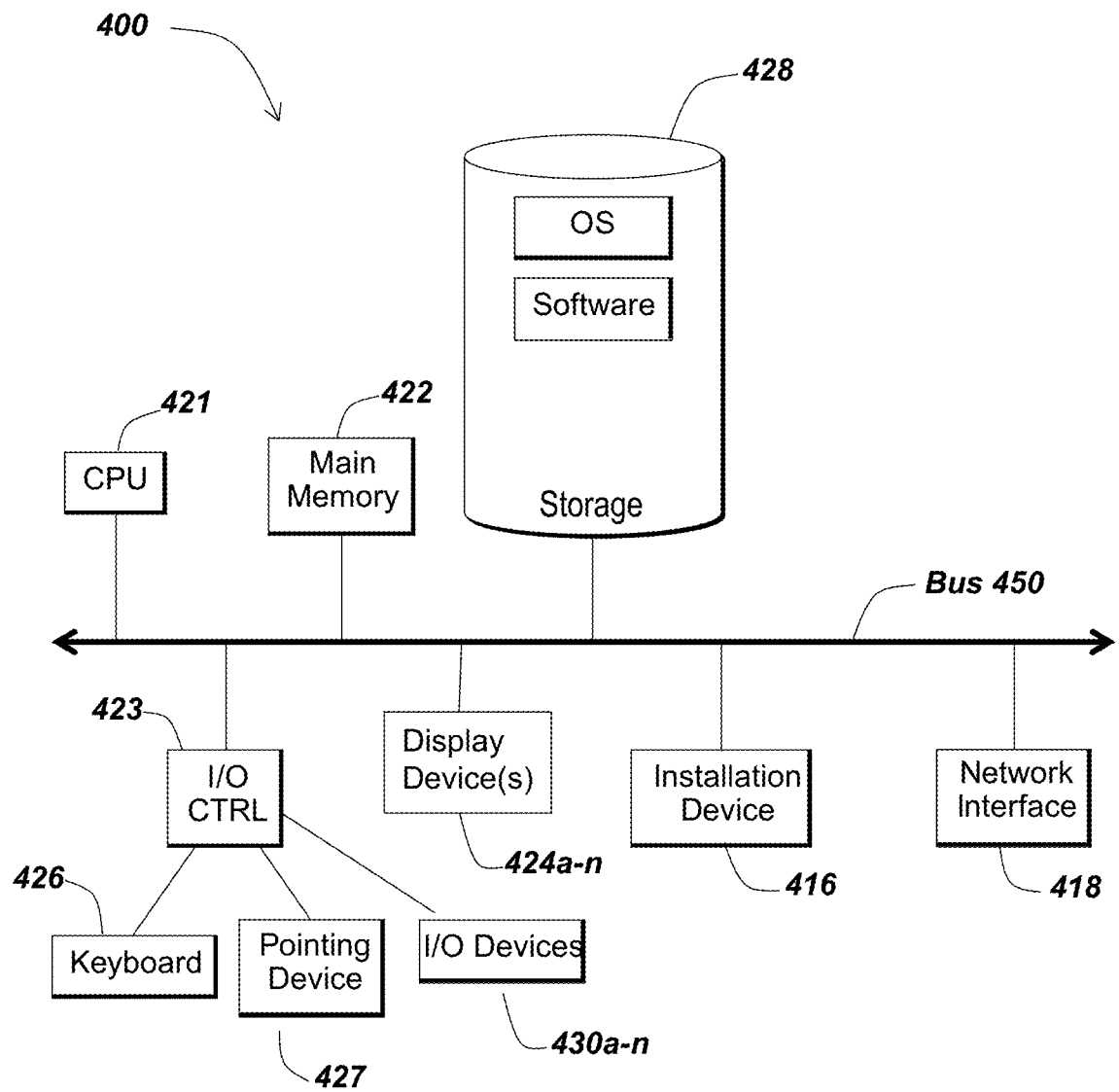
Figure 4C:
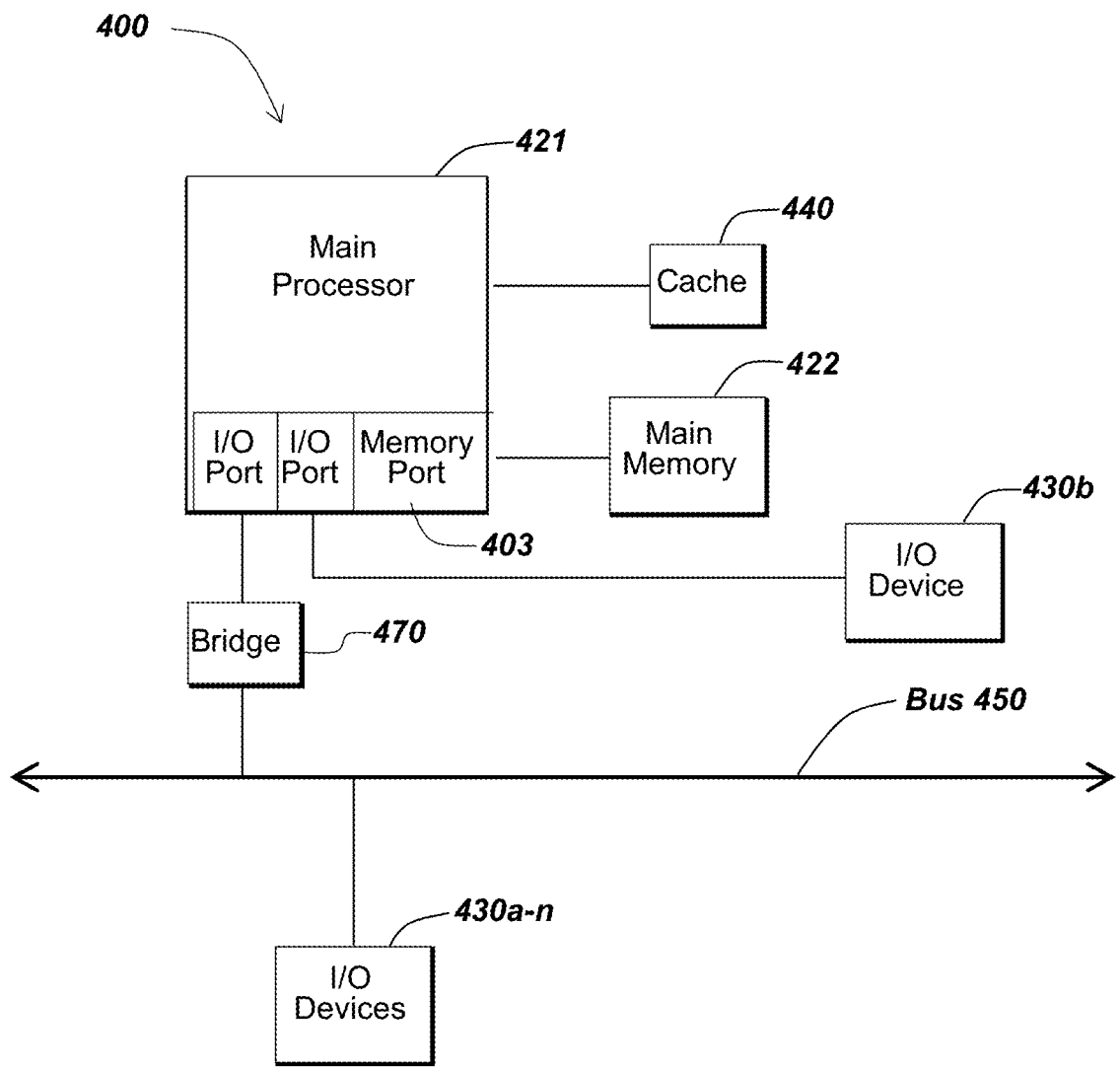

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402a-402n (also generally referred to as local machine(s) 402, client(s) 402, client node(s) 402, client machine(s) 402, client computer(s) 402, client device(s) 402, computing device(s) 402, endpoint(s) 402, or endpoint node(s) 402) in communication with one or more remote machines 406a-406n (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 402.

In one embodiment, a computing device 406 provides functionality of a web server. The web server may be any type of web server, including web servers that are open-source web servers, web servers that execute proprietary software, and cloud-based web servers where a third party hosts the hardware executing the functionality of the web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the ORACLE WEBLOGIC products provided by Oracle Corporation of Redwood Shores, Calif.

In some embodiments, the system may include multiple, logically-grouped remote machines 406. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 402 or a remote machine 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 400 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, Calif.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linux-variant operating system distributed by Red Hat, Inc., of Raleigh, N.C.; Ubuntu, a freely-available operating system distributed by Canonical Ltd. of London, England; or any type and/or form of a Unix operating system, among others.

The computing device 400 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device. In other embodiments, the computing device 400 is a mobile device, such as a JAVA-enabled cellular telephone/smartphone or personal digital assistant (PDA). The computing device 400 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 400 is a smartphone, POCKET PC, POCKET PC PHONE, or other portable mobile device supporting Microsoft Windows Mobile Software.

In some embodiments, the computing device 400 is a digital audio player. In one of these embodiments, the computing device 400 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 400 is a digital audio player such as those manufactured by, for example, and without limitation, Samsung Electronics America of Ridgefield Park, N.J., or Creative Technologies Ltd. of Singapore. In yet other embodiments, the computing device 400 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 400 comprises a combination of devices, such as a mobile phone combined with a digital audio player or portable media player. In one of these embodiments, the computing device 400 is a device in the Google/Motorola line of combination digital audio players and mobile phones. In another of these embodiments, the computing device 400 is a device in the IPHONE smartphone line of devices manufactured by Apple Inc. In still another of these embodiments, the computing device 400 is a device executing the ANDROID open source mobile phone platform distributed by the Open Handset Alliance; for example, the computing device 400 may be a device such as those provided by Samsung Electronics of Seoul, Korea, or HTC Headquarters of Taiwan, R.O.C. In other embodiments, the computing device 400 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Having described certain embodiments of methods and systems for dynamically generating at least one contextual user interface element within a user interface, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for dynamically generating at least one contextual user interface element within a user interface and establishing a connection between a first computing device associated with a user of the user interface and a second computing device associated with a contact center agent, based upon a selection by the user of the dynamically generated at least one contextual user interface element, the method comprising:

analyzing, by a user interface display component executing on a first computing device, a uniform resource locator (URL) of a web page while a user views the web page on a second computing device;

identifying, by the user interface display component, a plurality of support topics associated with the URL;

accessing, by the user interface display component, profile data associated with the user;

determining, by the user interface display component, that the profile data associated with the user identifies an existing travel reservation of the user;

generating, by the user interface display component, a first subset of the plurality of support topics;

modifying, by the user interface display component, a user interface displayed by the web page to include at least one user interface element associated with a support topic in the first subset of the plurality of support topics;

transmitting, by the user interface display component, to a routing component executing on the first computing device, an identification of the at least one user interface element;

accessing, by the routing component, a first mapping between the identification of the at least one user interface element and at least one attribute;

accessing, by the routing component, a second mapping between the at least one attribute and an identification of a first contact center agent having the at least one attribute; and establishing, by the routing component, a network connection between the second computing device associated with the user and a third computing device associated with the identified contact center agent.

2. The method of claim 1 further comprising:

determining, by the user interface display component, that the profile data associated with the user includes an identification of an existing travel reservation of the user;

identifying, by the user interface display component, a status of the existing travel reservation; and filtering, by the user interface display component, the first subset of the plurality of support topics based upon the identified status, generating a second subset of the plurality of support topics.

3. The method of claim 1 further comprising:

determining, by the user interface display component, that the profile data associated with the user includes an identification of an existing travel reservation of the user;

accessing, by the user interface display component, a third-party database storing data associated with the existing travel reservation of the user; and filtering, by the user interface display component, the first subset of the plurality of support topics based upon the identified status, generating a second subset of the plurality of support topics.

4. The method of claim 1, wherein modifying the user interface further comprises:

determining, by the user interface display component, that the profile data associated with the user includes an identification of an existing travel reservation of the user; and modifying, by the user interface display component, a user interface displayed by the web page to include a display of a subset of the data associated with the existing travel reservation.

5. The method of claim 4 further comprises providing, by the routing component, to the identified contact center agent, the subset of the data associated with the existing travel reservation.

6. The method of claim 1, wherein determining, by the user interface display component, whether the profile data associated with the user identifies an existing travel reservation of the user, further comprises determining, by the user interface display component, whether the profile data associated with the user identifies an upcoming travel reservation of the user.

7. The method of claim 1, wherein determining, by the user interface display component, whether the profile data associated with the user identifies an existing travel reservation of the user, further comprises determining, by the user interface display component, whether the profile data associated with the user identifies a past travel reservation of the user.

8. A method for dynamically generating at least one contextual user interface element within a user interface and establishing a connection between a first computing device associated with a user of the user interface and a second computing device associated with a contact center agent, based upon a selection by the user of the dynamically generated at least one contextual user interface element, the method comprising:

analyzing, by a user interface display component executing on a first computing device, an identifier of a screen displayed, within a mobile application, to a user viewing the mobile application on a second computing device;

identifying, by the user interface display component, a plurality of support topics associated with the identifier of the screen;

accessing, by the user interface display component, profile data associated with the user;

determining, by the user interface display component, whether the profile data associated with the user identifies an existing travel reservation of the user;

generating, by the user interface display component, a first subset of the plurality of support topics;

modifying, by the user interface display component, a user interface displayed by the web page to include at least one user interface element associated with a support topic in the first subset of the plurality of support topics;

transmitting, by the user interface display component, to a routing component executing on the first computing device, an identification of the at least one user interface element;

accessing, by the routing component, a first mapping between the identification of the at least one user interface element and at least one attribute;

accessing, by the routing component, a second mapping between the at least one attribute and an identification of a first contact center agent having the at least one attribute; and establishing, by the routing component, a network connection between the second computing device associated with the user and a third computing device associated with the identified contact center agent.

* * * * *